US010331917B2

(12) United States Patent
Marozau

(10) Patent No.: US 10,331,917 B2
(45) Date of Patent: Jun. 25, 2019

(54) DEVICE FOR READING INFORMATION FROM ELECTRONIC IGNITION SWITCH VIA POGO PIN IN MOTOR VEHICLES

(71) Applicant: Barys Marozau, Pruszków (PL)

(72) Inventor: Barys Marozau, Pruszków (PL)

( * ) Notice: Subject to any disclaimer, the term of this patent is extended or adjusted under 35 U.S.C. 154(b) by 0 days.

(21) Appl. No.: 15/729,621

(22) Filed: Oct. 10, 2017

(65) Prior Publication Data

US 2018/0101703 A1    Apr. 12, 2018

Related U.S. Application Data

(60) Provisional application No. 62/405,984, filed on Oct. 9, 2016.

(51) Int. Cl.
| | | |
|---|---|---|
| G06K 7/06 | (2006.01) | |
| G06K 7/04 | (2006.01) | |
| H01R 12/71 | (2011.01) | |
| B60R 16/023 | (2006.01) | |
| H01R 13/24 | (2006.01) | |

(52) U.S. Cl.
CPC .......... G06K 7/042 (2013.01); B60R 16/0231 (2013.01); H01R 12/716 (2013.01); B60Y 2410/115 (2013.01); H01R 13/2421 (2013.01)

(58) Field of Classification Search
CPC ..... G06K 7/0021; G06K 13/08; G06K 19/067
USPC .......................................................... 235/441
See application file for complete search history.

(56) References Cited

U.S. PATENT DOCUMENTS

| | | |
|---|---|---|
| 4,522,185 A | 6/1985 | Nguyen |
| 7,270,623 B2 | 9/2007 | Wang |
| 7,597,649 B2 | 10/2009 | Wang |
| 2007/0264849 A1* | 11/2007 | Steckler ............... G01R 31/045 |
| | | 29/719 |
| 2015/0285840 A1* | 10/2015 | Matsui ............... G01R 1/06722 |
| | | 324/754.14 |
| 2017/0012396 A1* | 1/2017 | Kwon ................. H01R 13/2428 |
| 2017/0222359 A1* | 8/2017 | Salmon ............. H01R 13/6205 |

* cited by examiner

*Primary Examiner* — Ahshik Kim
(74) *Attorney, Agent, or Firm* — Andrew Malarz, Esq.

(57) ABSTRACT

The present invention relates to a device used to read information from the EIS (Electronic Ignition Switch) in motor vehicles. The device is an adapter (interface), installed detachable to the rear of the EIS, that reads information from an ignition switch of motor vehicles, using a pogo pin (a device used in electronics to establish connection between two printed circuit boards), and transfers the obtained information to devices like MBprog, SMOK, UPA programmer or XEP 100 programmer.

10 Claims, 9 Drawing Sheets

DEVICE FOR READING INFORMATION FROM ELECTRONIC IGNITION SWITCH VIA POGO PIN IN MOTOR VEHICLES

The present invention relates to a device used to read information from the EIS (Electronic Ignition Switch) in motor vehicles. The device is an adapter (interface), installed detachable to the rear of the EIS, that reads information from an ignition switch of motor vehicles, using a pogo pin (a device used in electronics to establish connection between two printed circuit boards), and transfers the obtained information to devices like MBprog, SMOK, UPA programmer or XEP 100 programmer.

From the U.S. Pat. No. 4,522,185, titled "Switching Electronic Ignition", the electronic ignition system, comprising a unique combination of a high voltage switching regulator to provide substantially higher voltage to the ignition coil and a solid state power switch to produce a constant high energy ignition current, is known. The power switch is controlled by a pulser and a window generator which respond to virtually any available trigger source including conventional breaker points and generates an engine speed dependent window signal the duration of which defines the ignition energy characteristics.

From the U.S. Pat. No. 7,597,649, titled "Automatic transmission shifter assembly with integrated ignition actuator", the integrated ignition actuator is known. An electronic ignition switch, an ignition actuator and an ignition key interlock are mounted to the shift lever support. The ignition key interlock comprises an interlock member controllable by the ignition actuator to selectively block the solenoid from moving the shift lever control member to the unblock position.

From the U.S. Pat. No. 7,270,623, titled "Automatic transmission shifter assembly with integrated ignition actuator", an electronic ignition switch, an ignition actuator and an ignition key interlock are known, mounted to the shift lever support. The ignition key interlock comprises an interlock member controllable by the ignition actuator to selectively block the solenoid from moving the shift lever control member to the unblock position.

The adapter of the instant application comprises a non-conductive plate (4) with holes cut in a way that allows the plate to be mounted on the back of the ignition switch (1), a pogo pin (2) (a device used in electronics to establish, an usually temporary, connection between two printed circuit boards named by analogy with the pogo stick toy—the pogo pin usually takes the form of a slender cylinder containing two sharp, spring-loaded pins), a brass pin with a spring that allows to make contact between the ignition switch, and a PCB (printed circuit board) board (5). The PCB board allows the read information to be transferred from the pogo pin (2) to connectors (3) located on the top surface of the adapter. The connectors (3) allows various external devices, one at a time, to be plugged into the adapter to obtain information received by the connectors (3) from the ignition switch (1) through the pogo pin (2). In addition, the adapter contains a power supply unit for the ignition switch.

The plate (4) is made of any non-conductive material, for example glass, porcelain, plastic or rubber. As a preferred material transparent plastic is used, so it can be visible at the back of the ignition switch (1).

The pogo pin (2) is generally made of brass, but any other conductive material can be used, like copper, aluminum, or silver.

The PCB board (5) is generally made of non-conductive material covered with a layer of brass.

To use the adapter, an ignition switch needs to be disassembled and taken out from a motor vehicle. Next, the back cover of the ignition switch needs to be taken off, and the adapter needs to be positioned on the rear side of the ignition switch by inserting elements of the switch into the holes in the plate of the adapter. Finally, the adapter needs to be connected to another device which will process the information read from the ignition switch via the connectors (3), and cables connected to the connectors (3). There is no need to attach the adapter permanently into the ignition switch, e.g. by soldering, or to interfere with the switch mechanically or electronically.

In the preferable embodiment of the present invention the adapter is mounted on the rear side of the ignition switch on one end, and connected, on the other end, to an IR Tool (a device allowing reading information from the ignition switch of a motor vehicle through IR connector) and a Magic Eraser (a device allowing communication between a motor vehicle and a software through OBDII connector and Bluetooth connection) via two separate cables.

In the accompanying drawings, in which are shown several of the various possible embodiments of the present invention:

Figure 1:
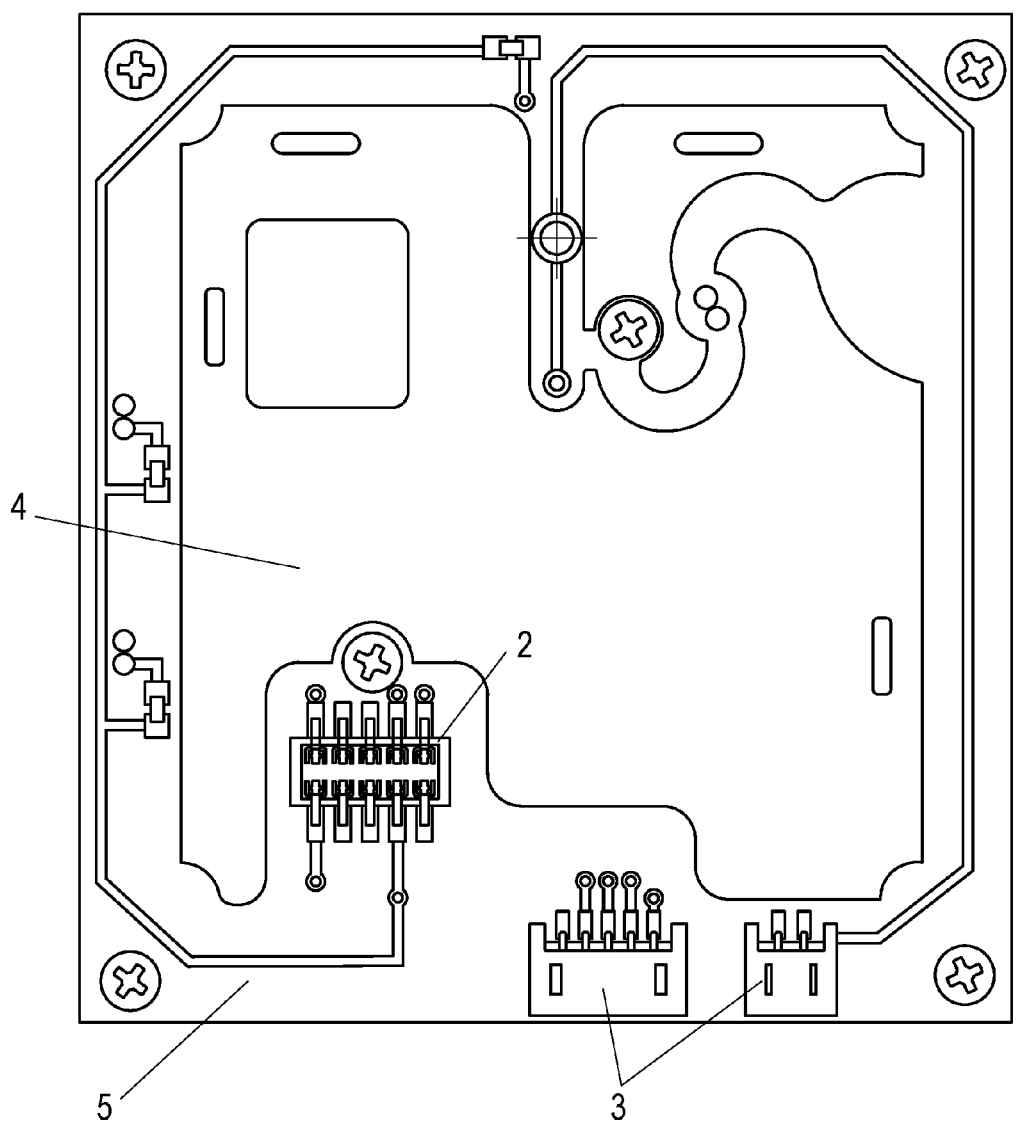
FIG. 1 is a top view of the adapter showing its elements.
Figure 2:
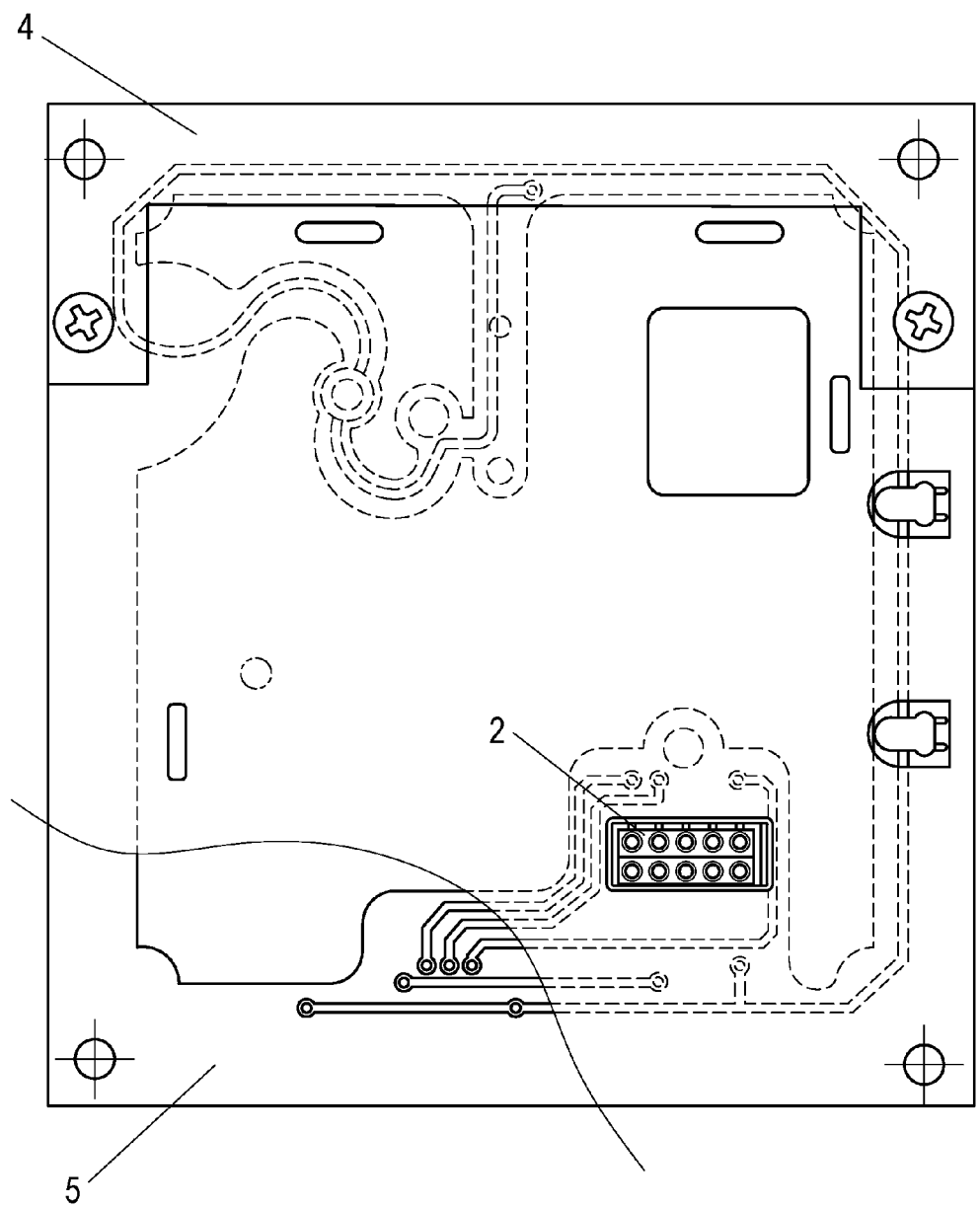
FIG. 2 is a bottom view of the adapter showing its elements.
Figure 3:
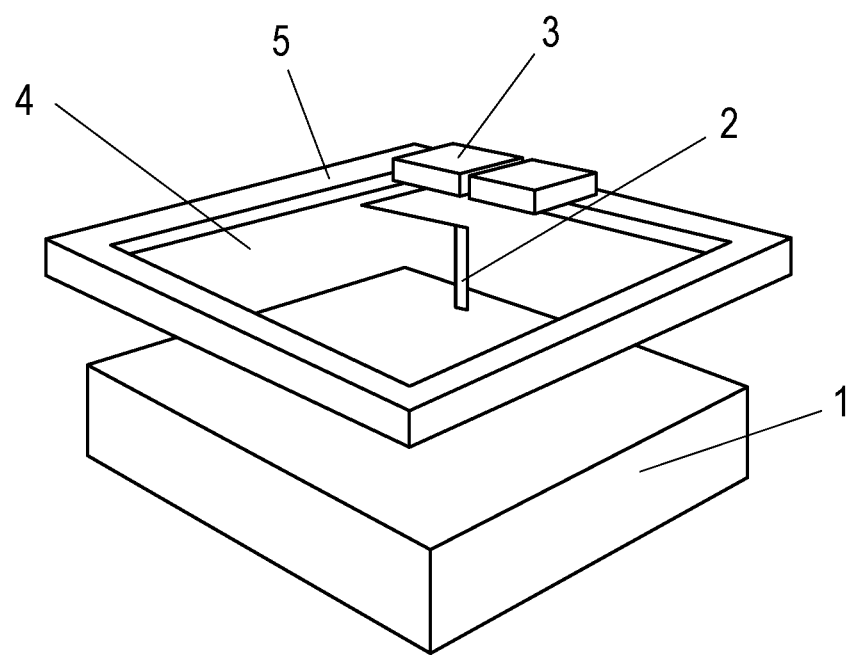
FIG. 3 is a perspective view of the ignition switch with the adapter before their connection showing main components of the adapter.
Figure 4:
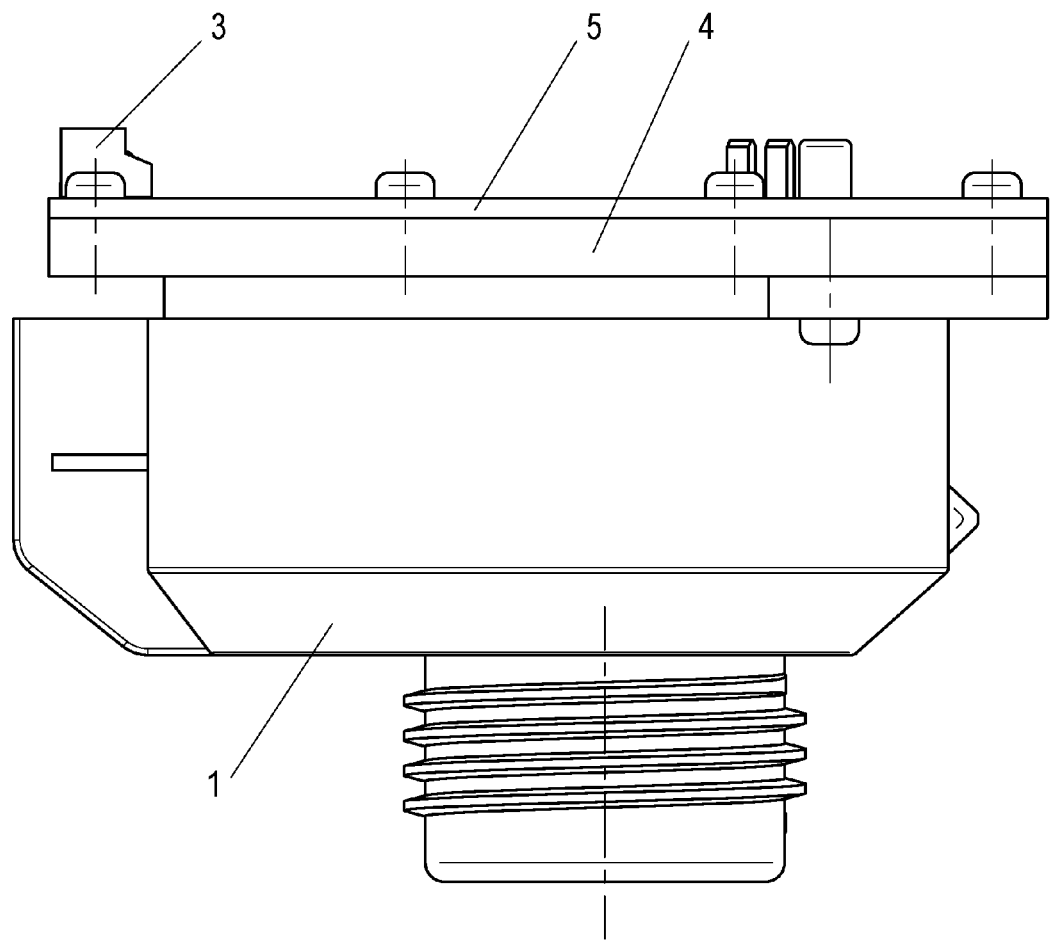
FIG. 4 is a side view of the adapter connected to the ignition switch.
Figure 5:
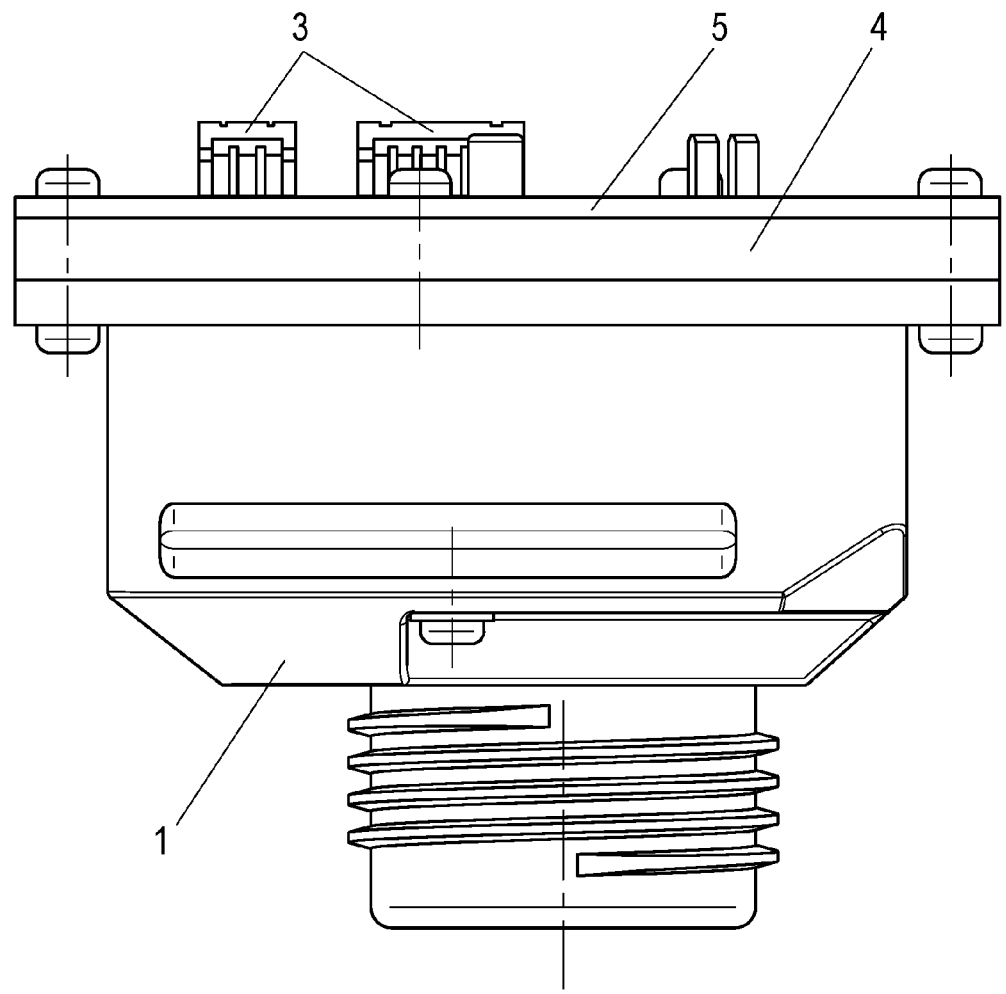
FIG. 5 is an additional side view of the adapter connected to the ignition switch.
Figure 6:
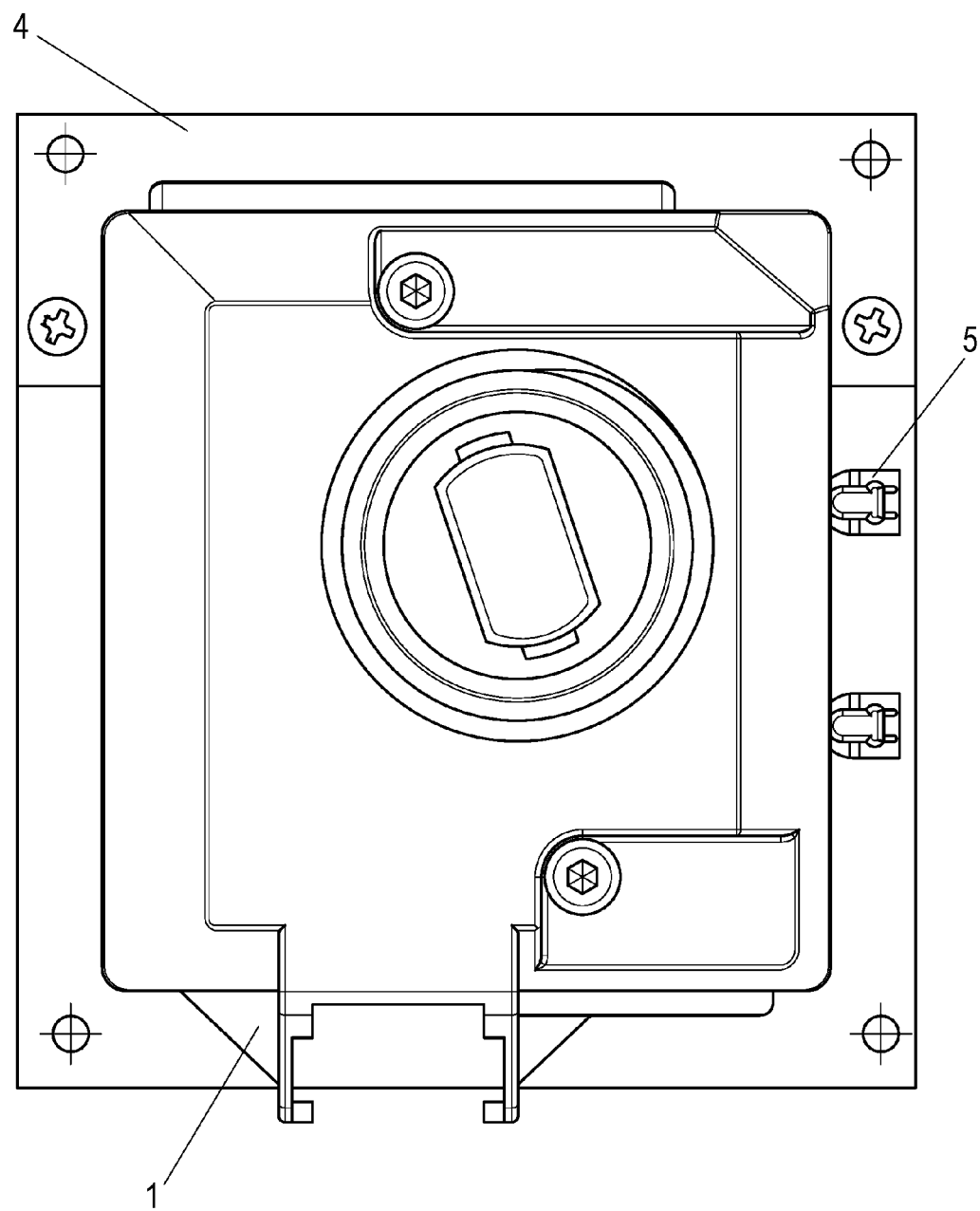
FIG. 6 is a bottom view of the ignition switch.
Figure 7:
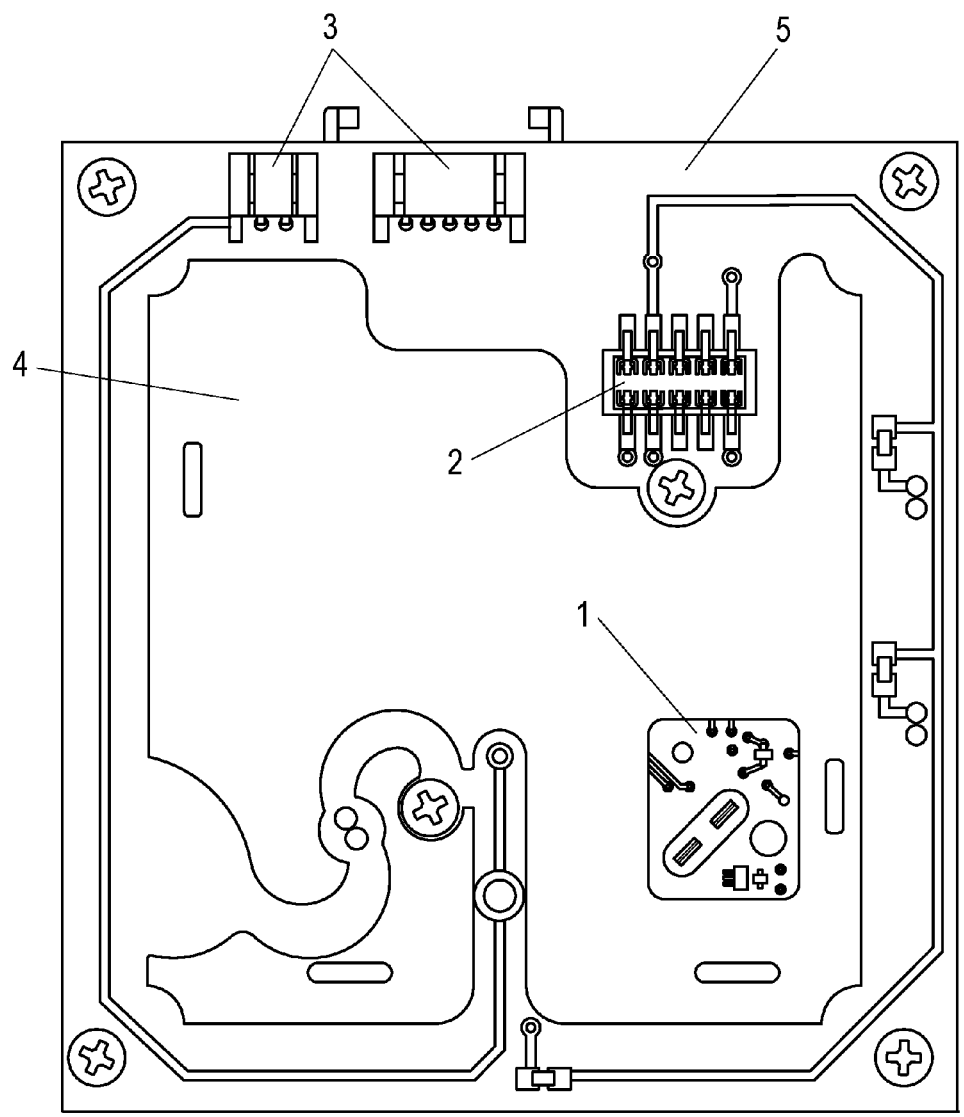
FIG. 7 is a top view of the adapter connected to the ignition switch.
Figure 8:
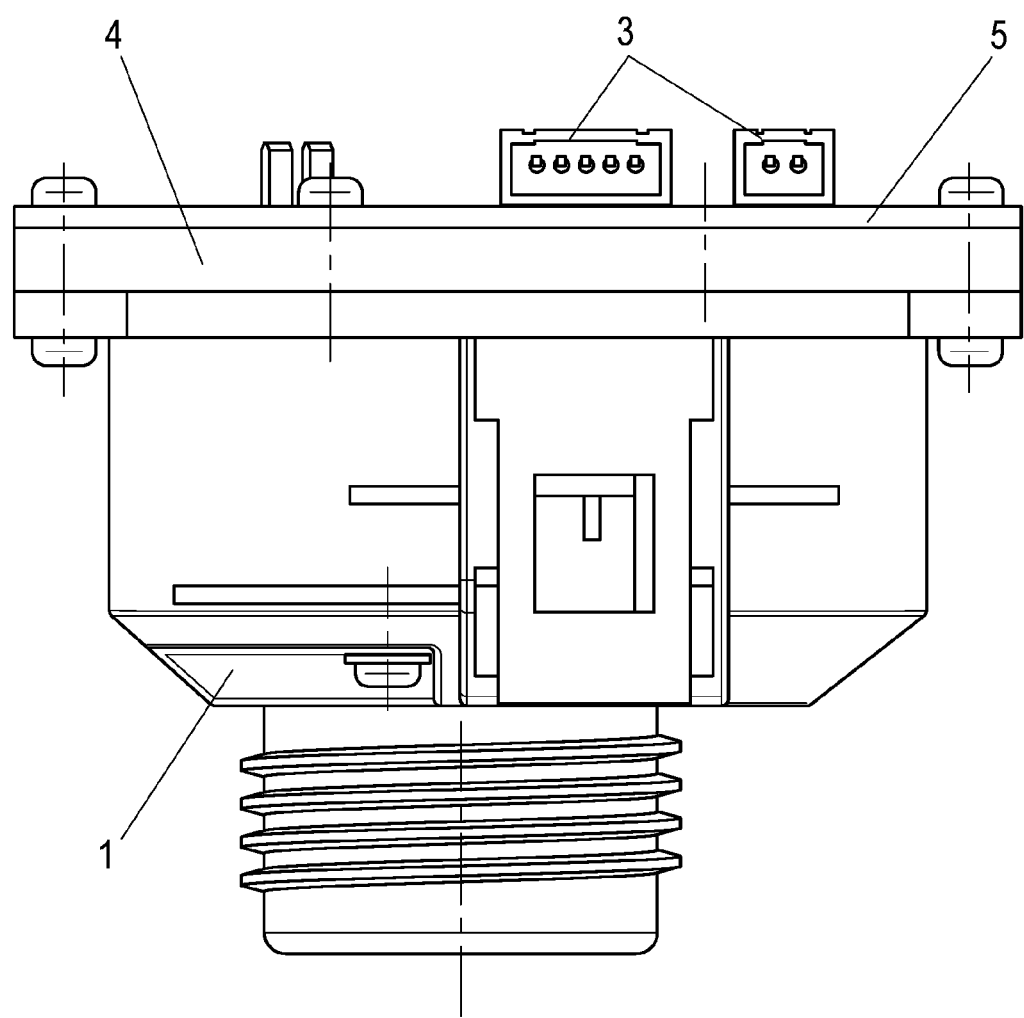
FIG. 8 is a rear view of the adapter connected to the ignition switch.
Figure 9:
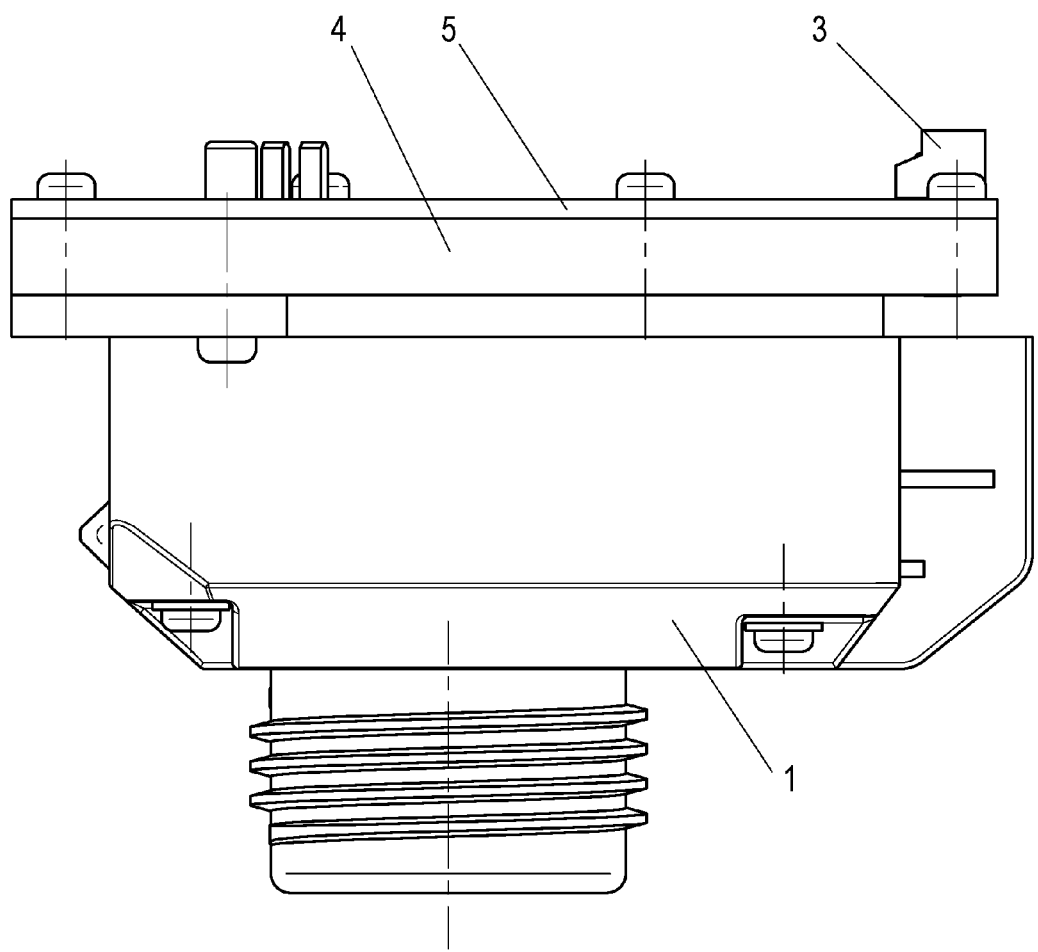
FIG. 9 is a front view of the adapter connected to the ignition switch.

In the alternative embodiment of the invention (not displayed in the drawings) a number of elements of the adapter may vary. For example the number of pogo pins, in different versions of this element, varies within the range of 1 to 6. Similarly, number of connectors located on the top surface of the adapter, varies within the range of 1 to 6. Also, the following devices can be connected to the adapter, in addition to the IR Tool, and the Magic Eraser, in the alternative applications of the adapter: MB Prog (a memory programmer of EEPROM/FLASH/processors), MB Key Prog (a car key programmer), X Prog-M (a memory programmer of EEPROM/FLASH/processors), EWS Keymaker (a car key programmer), UPA (a memory programmer of EEPROM/FLASH/processors). EEPROM (also written E2PROM and pronounced "e-e-prom", "double-e-prom" or "e-squared-prom") stands for electrically erasable programmable read-only memory and is a type of non-volatile memory used in computers and other electronic devices to store relatively small amounts of data but allowing individual bytes to be erased and reprogrammed.

FLASH—Flash memory is an electronic (solid-state) non-volatile computer storage medium that can be electrically erased and reprogrammed.

The above list of elements of the adapter, a list of devices which can be connected to the adapter, and a list of uses of the adapter is not exhausted and only represents certain preferred solutions and samples which do not limit other solutions/embodiments according to the present invention.

The invention claimed is:

1. A device for reading information from an electronic ignition switch via a pogo pin in motor vehicles, comprising
a non-nonconductive plate (4),
a pogo pin (2),
a printed circuit board (5), and
connectors (3), wherein
the device is an adapter or an interface, installed detachable to the rear of the electronic ignition switch, that reads information from the ignition switch, using the pogo pin, and transfers the obtained information to external devices.

2. The device according to claim 1, wherein the adapter is mounted on the rear side of the ignition switch on the one end, and connected, on the other end, to an IR Tool—a device allowing reading information from the ignition switch of a motor vehicle through IR connector, and a Magic Eraser—a device allowing communication between a motor vehicle and a software through OBDII connector and Bluetooth connection, via two separate cables.

3. The device according to claim 1, wherein the adapter is connected to MB Prog—a memory programmer of EEPROM/FLASH/processors.

4. The device according to claim 1, wherein the adapter is connected to MB Key Prog—a car key programmer.

5. The device according to claim 1, wherein the adapter is connected to X Prog-M—a memory programmer of EEPROM/FLASH/processors.

6. The device according to claim 1, wherein the adapter is connected to EWS Keymaker—a car key programmer.

7. The device according to claim 1, wherein the adapter is connected to UPA—a memory programmer of EEPROM/FLASH/processors.

8. A device for reading information from an electronic ignition switch via a pogo pin in motor vehicles, comprising
a non-nonconductive plate (4),
a pogo pin (2),
a printed circuit board (5), and
connectors (3), wherein
the printed circuit board, made of non-conductive material covered with a layer of brass, allows the read information to be transferred from the pogo pin (2) to the connectors (3) located on the top surface of the adapter.

9. The device according to claim 8, wherein the connectors (3) allow an external device selected from the group consisting of IR Tool, Magic Eraser, MBProg, SMOK, UPA programmer, XEP 100 programmer, EWS Keymaker, UPA, and X Prog-M, to be plugged, one at a time, into the adapter to obtain information received by the connectors (3) from the ignition switch (1) via the pogo pin (2).

10. A device for reading information from an electronic ignition switch via a pogo pin in motor vehicles, comprising
a non-nonconductive plate (4),
a pogo pin (2),
a printed circuit board (5), and
connectors (3),
wherein the non-conductive plate is made of transparent plastic, so it can be visible at the back of the ignition switch (1), and wherein the plate contains holes which allow the plate to be positioned/mounted on the rear side of the ignition switch (1) by inserting elements of the ignition switch into the holes of the plate of the adapter.

\* \* \* \* \*